March 19, 1968    H. A. CORRIHER, JR., ET AL    3,374,071
FIRE KINDLING DEVICES Filed May 27, 1963                                    5 Sheets-Sheet 1

INVENTORS
HENRY A. CORRIHER, JR.
LAWRENCE M. MASON
BY Albert H. Kiehner
ATTORNEY

INVENTORS
HENRY A. CORRIHER, JR.
LAWRENCE M. MASON
BY Albert H. Kirchner
ATTORNEY

March 19, 1968   H. A. CORRIHER, JR., ET AL   3,374,071
FIRE KINDLING DEVICES
Filed May 27, 1963   5 Sheets-Sheet 3

INVENTORS
HENRY A. CORRIHER, Jr.
LAWRENCE M. MASON
BY Albert H. Kirchner
ATTORNEY March 19, 1968 H. A. CORRIHER, JR., ET AL 3,374,071
FIRE KINDLING DEVICES
Filed May 27, 1963 5 Sheets-Sheet 4

INVENTORS
HENRY A. CORRIHER, JR.
LAWRENCE M. MASON
BY *Albert H. Kirchner*
ATTORNEY

United States Patent Office 3,374,071
Patented Mar. 19, 1968

3,374,071
FIRE KINDLING DEVICES
Henry A. Corriher, Jr., and Lawrence M. Mason, both of P.O. Box 7427, Atlanta, Ga. 30309
Filed May 27, 1963, Ser. No. 283,361
15 Claims. (Cl. 44—38)

This invention relates to fire kindling devices for igniting solid fuels such as charcoal and more particularly to a device of this type which in a preferred embodiment of the invention may be merchandised in a flat folded compact package and easily erected by the consumer when he is ready to kindle the fire.

The fire kindling device of the invention has particular utility for use in igniting the charcoal used in outdoor grills, and will be described in connection with such use. However, it will be understood that this is only an example of the utilization of the fire kindling device of the invention and that the device may be used in other environments and under other circumstances for starting a solid fuel fire.

Many different devices and methods have been used for igniting solid fuels such as those used in outdoor grills. For example, kits have been provided which combine charcoal and kindling into a single unitary package. Other expedients include the use of flammable liquids, candle-like devices, electric heating coils, blow-torch devices, and even paper and wood kindling. All of these prior devices and methods have inherent disadvantages which it is an object of this invention to overcome. Flammable liquids are dangerous to use. Prior art packages combining charcoal and kindling into a single unit are usually expensive and are bulky and space-consuming. Electric fire starting devices require a source of electricity which is frequently not available at the site where the charcoal fire is being started. The use of kindling materials such as pine kindling may impart an objectionable odor or taste to food which is prepared over a fire started with these materials.

A further serious disadvantage of all of the prior art devices and methods of kindling charcoal fires and the like is that they are very slow and usually require 15 to 30 minutes to ignite a typical quantity of charcoal which might be used in an outdoor grill, such as 1¾ to 2½ pounds of charcoal.

Many of the prior art fire starting devices and methods result in non-uniform burning of the fuel pieces which prolongs the time required for satisfactory ignition of the fire. Also, some of the prior art fire starting devices and methods require touching the fuel pieces which are customarily dirty.

Accordingly, it is an object of one embodiment of this invention to provide an igniting device for use with solid fuel such as charcoal which can be merchandised in a compact folded form and subsequently easily erected by the consumer at the site of the fire being kindled.

In another embodiment, however, the invention contemplates merchandising a quantity of solid fuel packaged in a combustible container in combination with a chimney member adapted to be assembled in operative enclosing relation with the container prior to use.

It is another object of the invention to provide a fire kindling device which is safe, rapid, and efficient in its operation and which is capable of igniting a solid fuel fire much faster than fire kindling devices and methods of the prior art.

It is another object of the invention to provide a fire kindling device in which the components thereof are either sufficiently consumed during the kindling of the fire so as to leave no undesirable residue, or may be easily removed after the first has been started.

Still another object of the invention is the provision of a fire kindling device for igniting charcoal fires or the like which insures uniform burning of the charcoal by the end of the ignition period.

Still another object of the invention is the provision of a fire kindling device for igniting charcoal fires or the like in which the fuel need not be touched preparatory to igniting the fire.

In achievement of these objectives, there is provided in accordance with a preferred embodiment of the invention a fire kindling device particularly suitable for use in igniting charcoal fires. The kindling device includes an inner container or fuel box formed of relatively combustible material such as fiberboard or chipboard and preferably impregnated with a flammable material such as paraffin wax. The fuel box is preferably of collapsible construction and foldable into rectangular flat compressed form for ease in packaging, the folded fuel box being unfolded and erected by the consumer and filled with charcoal at the site of the fire. The fuel box includes notched openings at the junctions of the side walls adjacent the lower edge of the box to permit passage of air through the contents of the fuel box to promote ignition, and more importantly for the purpose of providing points to which a match may be applied in starting the fire.

The fire igniting device also includes a relatively incombustible chimney member preferably formed of aluminum foil or the like which is seamed to define a tubular sleeve foldable into flat rectangular shape for ease in packaging. The aluminum foil web or webs of which the chimney is formed has a plurality of ribs formed therein which extend vertically and in circumferentially spaced relation to each other in the erected chimney. These ribs assist in maintaining vertical rigidity of the chimney until ignition of the solid fuel is substantially completed. Some of the ribs may serve as fold lines in folding the chimney for packaging and in forming it for use. The tubular aluminum foil sleeve is unfolded by the consumer and rolled into a generally cylindrical shape which permits the chimney to be telescopically positioned about the inner container or fuel box. The chimney includes notched or other suitable openings at the lower end thereof which are lined up with the openings at the corners of the fuel box to permit the passage of air into the lower end of the chimney and to permit insertion of a match into engagement with the points at the notched openings of the fuel box. The chimney and the fuel box are so dimensioned relative to each other as to provide a clearance therebetween which defines flues between the fuel box and the chimney to promote ignition of the box and thence the fuel contents thereof. The combustible fuel box is consumed almost completely during the ignition process, and the incombustible aluminum foil chimney collapses during the last stages of the ignition and may be easily removed from the fire after the ignition is completed.

Further objects and advantages will become apparent from the following description taken in conjunction with the accompanying drawings in which.

Figures 1, 2, 3, 4, 5, 6:
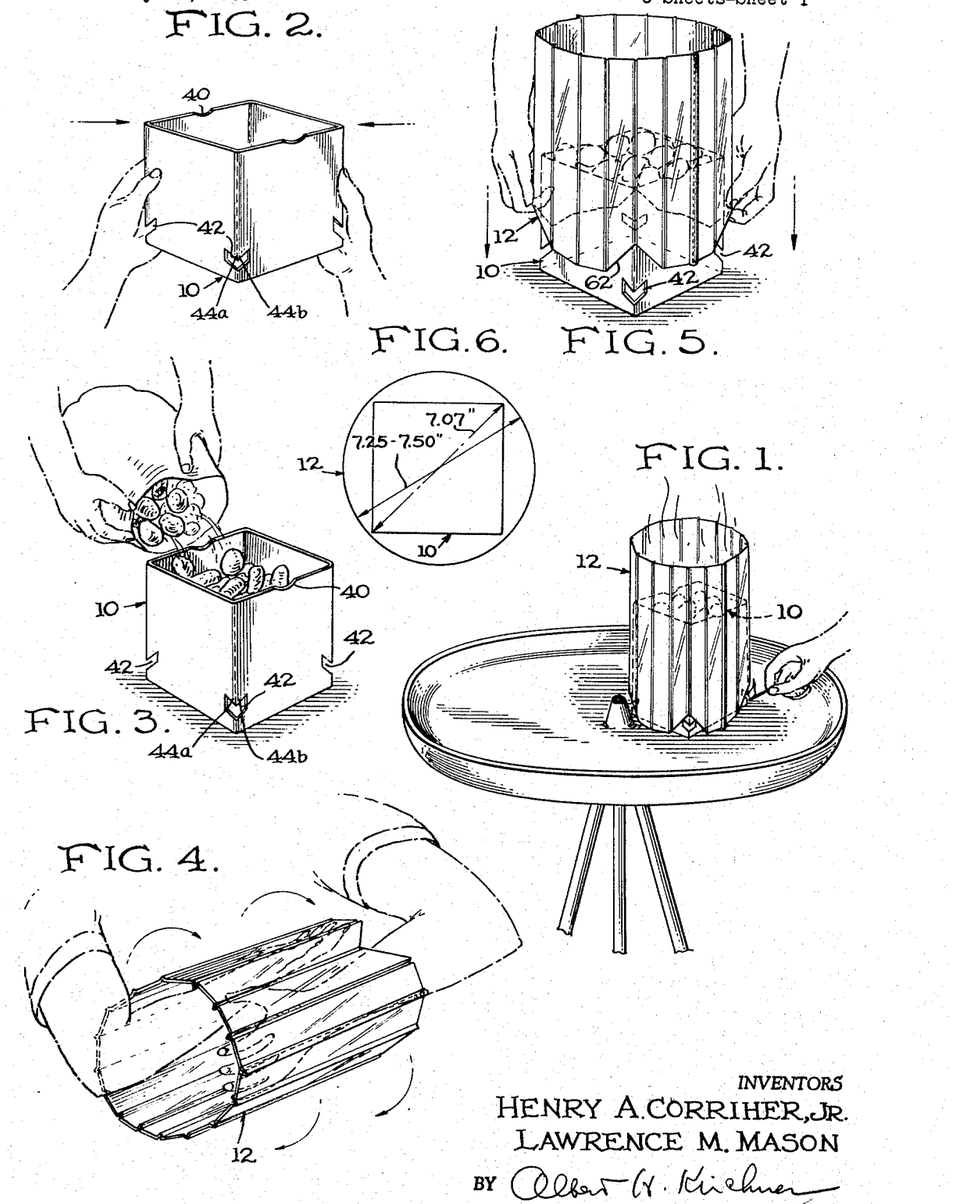
FIGURE 1 is a perspective view showing the fire kindling device of the invention in position in the fire bowl of an outdoor grill.
FIG. 2 is a perspective view showing the manner of erecting the fuel box from its initially collapsed folded position.
FIG. 3 is a perspective view showing the user placing the solid fuel such as charcoal in the erected fuel box.
FIG. 4 is a perspective view showing the manner of opening the chimney component from its initially collapsed folded position to the generally cylindrical shape in which it is used.
FIG. 5 is a perspective view showing the erected chimney being telescopically positioned over the erected fuel box of the fire kindling device.
FIG. 6 is a diagrammatic view showing typical relative dimensions of the horizontal cross sections of the fuel box and the chimney member.

Referring now to the drawings, and first to FIGS. 1 and 5, the fire kindling device of this form of the invention includes an inner container or fuel box generally designated 10 formed of a relatively combustible material such as fiberboard or the like, and a hollow, open-ended chimney member generally indicated at 12 formed of relatively incombustible material such as aluminum foil which in operative position is telescopically positioned about the inner container 10 so as to extend from the lower end thereof to a predetermined height. These members and their cooperative relation with each other will be described in detail hereinafter.

Description of fuel box

Figure 7:
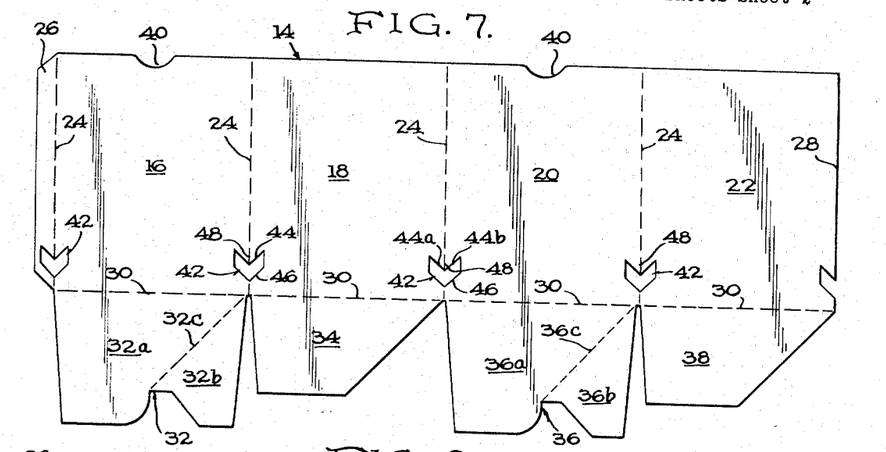
FIG. 7 is a plan view of the developed blank of fiberboard or the like which is used to form the fuel box of the fire kindling device.

As best seen in FIG. 7, the inner container or fuel box 10 in the illustrated embodiment is formed from a single blank 14 of combustible material such as low density fiberboard. The thickness of the fiberboard material of blank 14 should be selected so that the fuel box 10 is stiff enough that it will not bulge greatly when filled and thereby decrease appreciably the air space between the fuel box and chimney and so that the box will burn long enough to insure ignition of the solid fuel such as charcoal but should not be so thick as to leave an objectionable residue when the action of the kindling device is completed. Blank 14 includes four side wall panels respectively indicated at 16, 18, 20, and 22, defined by perforated or scored lines indicated at 24. An end seam strip 26 is integral with and projects from side wall panel 16 at one end of the blank, being separated from side wall panel 16 by a perforated or scored line 24. Seam strip 26 is subsequently glued or otherwise secured to the opposite end edge 28 of panel 22 when the blank 14 is closed upon itself to form a fuel box of parallelopiped shape.

Each of the side wall panels 16, 18, 20, and 22 has a bottom-forming panel or tab integrally connected thereto along one of the perforated or scored lines 30, the respective bottom panels or tabs being numbered 32, 34, 36, and 38. The bottom panel 32 which extends from side wall panel 16 is divided by perforated or scored line 32c into the larger and smaller triangular sections respectively indicated at 32a, 32b. Similarly, bottom panel 36 which extends from side wall panel 20 is divided by perforated or scored line 36c into larger and smaller triangular sections 36a and 36b. The bottom panels 34 and 38 which respectively extend from side panels 18 and 22 are each of generally truncated triangular shape.

Figure 8:
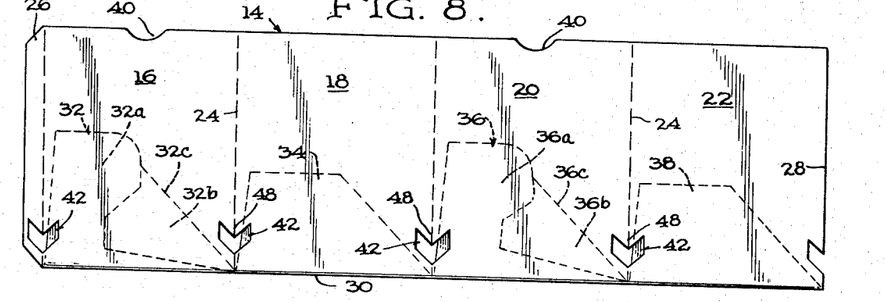
FIG. 8 is a view of the blank of FIG. 7 in an intermediate step of the folding operation used to form the collapsible fuel box.

To form the finished fuel box, the bottom panels 32, 34, 36, and 38 are respectively folded in back of the side wall panels 16, 18, 20, and 22, as shown in dotted outline in the intermediate blank form of FIG. 8. The smaller triangular section 32b of bottom panel 32 is folded inwardly about the perforated or scored line 32c so as to lie rearwardly of the larger triangular section 32a. Similarly, smaller triangular section 36b is folded about scored line 36c so as to lie rearwardly of larger triangular section 36a. With the bottom panels 32, 34, 36, 38 folded rearwardly of the side wall panels as shown in FIG. 8, and with the smaller triangular sections 32b, 36b folded rearwardly of the larger triangular sections 32a, 36a, the blank 14 is then folded upon itself and seam strip 26 is adhesively or otherwise attached to the opposite end edge 28. The rearwardly directed surfaces of triangular section 32b and of bottom panel 34 are adhesively or otherwise secured to each other, and the rearwardly-facing surfaces of triangular section 36b and of bottom panel 38 are adhesively or otherwise secured to each other. The blank will then be in the folded position shown in FIG. 9 in which the side panels 16 and 22 respectively lie rearwardly of the side panels 18 and 20. The blank in FIG. 9 is in the flat folded form in which it is received by the consumer, with collapsed side walls, and collapsed automatic self-locking bottom wall, ready to be erected by the consumer.

Figure 9:
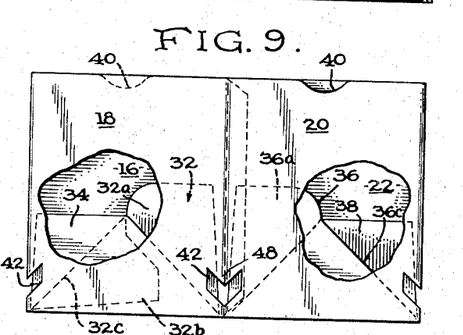
FIG. 9 is a view, partially broken away, of the fuel box of FIG. 8 in the folded, collapsed condition in which it is received by the consumer.
Figure 10:
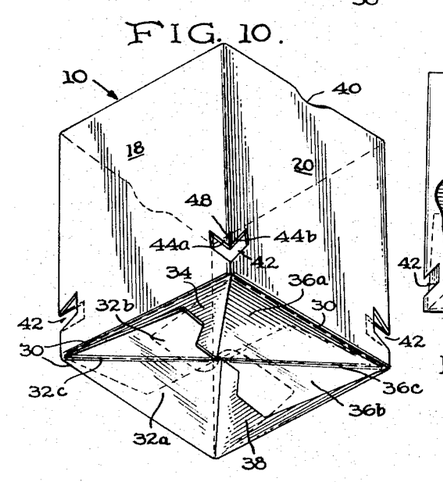
FIG. 10 is a perspective view of the erected fuel box formed from the blank of FIGS. 7, 8 and 9, and showing the bottom of the fuel box in its automatically locked operative position.
Figure 11:
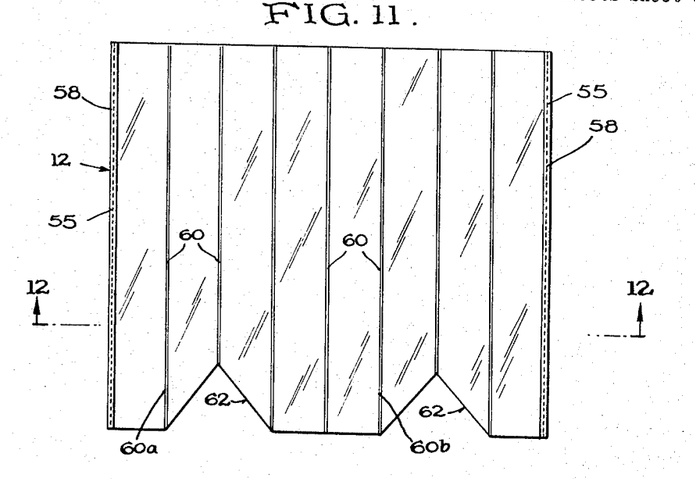
FIG. 11 is a plan view of the metal foil chimney of the kindling device in flat, collapsed form ready to be opened up into generally cylindrical shape.

The folded fuel box in the form shown in FIG. 9 may be erected into the hollow box-like container form shown in FIGS. 2, 3, and 10 by sharply pushing toward each other the opposite side edges as shown in FIG. 2, causing the four side panels 16, 18, 20, and 22 to swing about their respective perforated or scored lines 24 to produce a hollow configuration of rectangular cross section. Use of perforated lines 24 enables the corners to break better and form 90° bends which help prevent bulges of the box sides with resultant decreases in the air space between box and chimney. As the side wall panels move about lines 24, the attached bottom panels 32b–34 and 36b–38 swing about the perforated or scored lines 30, 32c, and 36c to cause the bottom panels to snap automatically into the locked position best seen in FIG. 10 of the drawings.

In the closed or locked position of the bottom panels, best seen in FIG. 10, a large area of bottom panel section 32a lies beneath bottom panel 38 and beneath panel section 36b attached to panel 38. Similarly, a large area of bottom panel section 36a lies beneath bottom panel 34 and beneath panel section 32b attached to panel 34. In the locked position, the fuel box bottom includes three plies of material over a large portion of its area due to the attachment of triangular sections 32b and 36b to bottom panels 34 and 38, respectively, and also due to the underlying relation of panel section 32a to panel 38 and to panel section 36b and the underlying relation of panel section 36a to panel 34 and to panel section 32b. As will be explained later, the multi-ply construction of the bottom has a useful relation to the burning characteristic of the fuel box 10.

Although the automatic bottom is an attractive feature from the standpoint of convenience for the user, other bottom styles such as tuck, lock flap, or other automatic designs are functionally satisfactory. The kindling device will function if there is no bottom at all but comprises merely a flammable "sleeve" to hold the fuel and provide initial burning to start the process of ignition. If no bottom is used, a slight inward taper of the walls of the sleeve to give a smaller bottom than top will help prevent the sleeve from "riding up" when it is being filled.

The blank 14 is provided in the upper edge of the side panels 16 and 20 with thumb notches 40 which permit insertion of a thumb to aid in slightly separating the side walls 18 and 20 from the underlying side walls 16 and 22 of the blank to assist in snapping the box to open position when pressure is manually applied to push inward the opposite side edges of the box as shown in FIG. 2.

An important feature of the fuel box construction is the provision of notched openings generally indicated at 42 which are so located on the blank as to lie symmetrically on either side of the perforated lines 24 which define the junctions of the side wall panels, the notched openings 42 being located a short distance above the bottom edge of the blank. Thus, the notched openings 42 respectively lie at the four corners of the erected fuel box.

In the embodiment shown in the drawings, the notched openings 42 are of what may be called chevron shape and include upper and lower bounding edges 44 and 46, each respectively of V shape, and connected at their opposite ends by straight, normally vertical bounding edges. A slit or cut 48 bisects the upper V edge 44 to provide two points 44a, 44b to which a match may be applied for easy ignition of the box 10. The two points 44a, 44b are preferably "fuzzed" during the manufacturing operation, i.e., formed with roughened edges, to further facilitate the ignition of the material of the fuel box at this location.

In a modified form of notched cut, not shown in the drawings, the upper edge 44 may be formed in a W shape, rather than in the V shape shown in the drawings. The W shape, although more difficult to manufacture, has the functional advantage that it provides two points in the upper edge of the W-shaped edge, each of which may be bisected by a slit or cut in the same manner as described for the V edge to provide in each such notched cut a total of four lighting points instead of the two lighting points provided by the bisected V edge.

Although the above forms are simple and functionally satisfactory, any hole shape using one or more sharp points is adequate.

The notched openings 42 in addition to serving as lighting tips serve the further function of providing air inlets into the lower end of the fuel box to promote the ignition of the solid fuel.

In accordance with an important feature of the invention, the blank 14 from which the fuel box 10 is formed is preferably impregnated or coated with a flammable material such as paraffin. Since there must be shipment and storage of the containers 10 at possibly high temperatures, the paraffin wax used should have a sufficiently high melting point to minimize "bleeding" or melting of the paraffin, and should also have a sufficiently high blocking temperature to prevent or minimize adhesion of facing waxed surfaces. A suitable wax for this purpose is "Shellwax 270" manufactured by Shell Oil Company. This wax has a melting point of 140.5° F., a blocking temperature of 126° F., and a flash point of 440° F. Use of a "food grade" paraffin wax such as "Shellwax 270" has the further advantage that such material is non-toxic. Use of a high flash point material prevents flash back when lighting and controls burning rate.

In an embodiment constructed in accordance with the invention, the blank 14 is dimensioned to form an erected fuel box having a 5-inch square base, with side walls 6 inches in height. This size box will hold approximately 2¼ pounds of charcoal briquettes of currently standard size. The blank is made of fiberboard or chipboard having a caliper of approximately 18 to 22 points (0.018 inch to 0.022 inch in thickness). The blank 14 for a fuel box of this dimension should have a minimum of approximately 9 grams and a maximum of approximately 20 grams of wax impregnated into the fibers so as to give it an essentially dry surface and providing a wax impregnation of approximately 20% to 60% by weight for the calipers listed above.

When the wax content is too low, the fuel box is more difficult to light and may not burn well, especially on damp days. Furthermore, with low wax content the burning fiberboard or chipboard can emit an unpleasant smell and an acrid bluish smoke characteristic of burning paper. This smell and smoke may be favorably modified by impregnating or coating the fuel box with a flammable material such as the paraffin wax. The fire kindling device will work without any flammable material added to the bare fuel box, but will require slightly longer ignition time and will manifest the other undesirable characteristics above noted.

When the wax content is too high, there is excessive smoke when the initial flames die down and burning is taking place down near the bottom of the box. Furthermore, excessive wax causes the flames to be so hot during the early stage of ignition that the sides of the metal foil chimney may be weakened and collapse prematurely.

The blank 14 may be made using either pre-wax stock or by waxing the completed fuel box blanks. It is found that good impregnation of chipboard takes place when the paraffin wax is heated to a temperature in the range of 250° F. to 300° F. High wax temperature, coupled with low density chipboard, and a sufficiently long dwell time of the blank in the paraffin bath during the impregnation step, permits satisfactory wax impregnation of blank 14.

It has been found difficult to impregnate chipboard blanks with the desired amount of wax using unmodified waxing machines such as those used commercially to wax folding cartons. However, kraft fiberboard such as kraft linerboard can be blanked and then impregnated satisfactorily using a "cold waxer" without the waterbath and a wax temperature in the range of 210° F. to 260° F.

In addition to serving as a fuel, the paraffin wax which is impregnated in the fiberboard fuel box 10 also serves to seal the fiberboard partially against penetration of moisture, thereby promoting flammability of the fuel box on damp days as well as on dry days.

Although paraffin wax is a stable flammable material and has been used to impregnate the fiberboard fuel box in the preferred embodiment, other flammable materials might be used. For example, alcohol burns with a hot, smokeless flame and could be used providing that the wetted fuel box was packaged in a vapor-proof wrapper to prevent leakage or evaporation of the impregnating substance before use.

In the embodiment of the fuel box hereinbefore described, the paraffin wax or other flammable material is uniformly impregnated throughout the entire body of the blank 14 from which the fuel box is formed. In a modified embodiment, the paraffin wax may be more heavily impregnated in the bottom-forming panel members 32, 34, 36, and 38 than in the side wall panels 16, 18, 20, and 22. The lighter application of the wax to the side wall panels assists in providing an initial updraft, while the heavier application to the bottom panels in combination with the multi-ply construction of the bottom provides a sustained burning of the bottom until the fuel is well ignited.

Despite the high wax content of the carton blank 14, gluing of the seam strip 26 to the edge 28 or gluing of the bottom flaps to each other does not present a problem. It has been found that commercial resin or other type glues which either dry hard or are so highly plasticized as to remain tacky are satisfactory for gluing purposes so long as the wax is impregnated into the fiberboard and does not appear as free surface wax at the glue joint.

*Description of chimney*

The chimney 12 of the fire kindling device is preferably made from a web or webs of aluminum foil seamed to form a tubular sleeve, which may be packaged and sold to the consumer in flat folded form and subsequently shaped by the consumer into a hollow cylinder.

Thus, as best shown in FIGS. 11-15. inclusive, two webs or sheets 50 and 52 of aluminum foil, each of substantially rectangular shape, are positioned in superposed relation to each other with their respective end edges 54 and 56 lapped over, and with the end edges 56 of sheet 52 lapped over the edges 54 of sheet 50. The oppositely disposed seams 58 may be secured by piercing the edges 54 and 56 at a plurality of points 55 and clinching the metal displaced by the piercing operation around the pierced openings. The seams 58 may be formed by the method just described or by any suitable method as long as the resultant seams are sufficiently strong to withstand the stresses imposed on the seamed sleeve when the consumer rolls it from its flat folded form to the cylindrical form in which it is used. The stresses in use will customarily be greatest during this forming operation. Furthermore, the seams must not open up or fail at temperatures approaching the melting point of aluminum so that most glues are eliminated and for this reason a mechanical joint has been chosen in the preferred embodiment.

Instead of using two webs of metal foil as shown, a single web may be used which is folded on itself and the two opposite edges of the folded web seamed together.

Each of the webs 50 and 52 is formed with a plurality of spaced ribs 60 which structurally reinforce the chimney formed from the foil sheets as well as serving as fold lines both for folding the chimney into its flat packaged form and for unfolding the chimney and forming it into a cylindrical shape. Ribs 60 are an important feature of the construction since they help insure vertical rigidity of the erected chimney until ignition of the solid fuel is substantially completed. The cold working of the metal foil to form the ribs also serves to increase the temper or hardness of the metal foil in the region of the ribs, thereby imparting further strength to the erected chimney 12. It will be noted that the ribs 60 of each of the superposed webs 50 and 52 extend upwardly on one side of the central axis of the webs, as indicated at 60a, and extend downwardly on the other side of the central axis of the web, as indicated at 60b. Thus, when the webs 50 and 52 are folded 180° upon themselves, as indicated by the arrow in FIG. 12, to assume the form shown in FIG. 13, the ribs 60a and 60b nest together. In forming the chimney into operative configuration the upwardly extended and downwardly extended ribs, as well as the seam or seams, serve as fold lines to aid in obtaining a generally cylindrical shape from the flat panels of the packaged form.

In an alternative form, not shown, the outer quarters of the chimney are folded inward to give a packaging form generally equivalent to that described above except that the directions of the ribs would have to be appropriately chosen. Further folds would be possible to meet specific packaging requirements.

The chimney member formed by the seamed metal foil webs 50 and 52 is provided with triangular openings or notches 62 at spaced positions opening upwardly from the bottom edge of the chimney.

Figure 13:
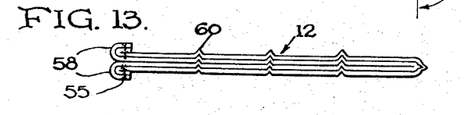
FIG. 13 is a view of the blank of FIG. 11 doubled over on itself into the form in which it is delivered to the consumer.

It will be noted that the notches 62 are in spaced relation away from the seams 58 and also away from the central fold line about which the sleeve is folded to the form of FIG. 13. The illustrated location of the notches 62 has the advantage that when the tubular foil sleeve is formed into its cylindrical shape with the notches 62 located at the corners of the rectangular fuel box, as will be described hereinafter, the seams and fold lines are not located at the corners of the fuel box. The seams 58 and 180° fold lines have a tendency to hold an acute angle when the chimney is opened up, although this may be corrected by vigorous forming of the chimney by the consumer, so that if the notches 62 were to coincide with the seams 58 and 180° fold lines, the clearance between the chimney and fuel box would be objectionably reduced adjacent the corners of the fuel box, thereby impeding the air flow in the corner regions and impeding the air flow through the notched corner openings 42 into the fuel box.

Instead of using triangular notches 62 opening upwardly from the bottom edge of the chimney, it is also possible to use holes of circular or other shape spaced a short distance above the bottom edge of the chimney. However, holes are not as satisfactory as the notches 62 since there is a tendency for the holes to pick up hot coals when the chimney is removed from the fire at the termination of the ignition period, whereas this problem does not exist when the notched openings 62 are used.

The size and shape of the air holes 62 are not critical, but they should be large enough so that an unrestricted air flow through the holes is possible, and should be small enough to prevent fuel from falling through the holes before ignition is complete.

To facilitate separation of the webs 50 and 52 of the folded chimney sleeve preparatory to shaping the sleeve into its cylindrical form, the webs 50 and 52 may be provided with thumb notches in the upper edges thereof. The foil may be coated with stearic acid or other slippery material to give it a "textured" surface which will assist in preventing edgewelding when two or more layers are cut simultaneously during manufacture, as well as facilitating separation of the layers of the folded chimney by allowing them to slide easily with respect to one another.

The aluminum foil of which chimney 12 is formed should preferably have a mildly embossed surface, although this is not absolutely necessary. The embossed surface of the foil provides improved formability of the foil to operative configuration, and increases its overall strength since the cold working used to produce the embossed surface increases the temper or hardness of the foil at the embossed areas. The foil gauge should be so selected that the material will retain its strength during the initial heavy flame but later will tend to rupture and collapse when the charcoal is completely ignited. The foil gauge and temper should also be so selected that the consumer is not likely to cut himself when handling the foil.

The aluminum foil of which the chimney 12 is constructed may be of 1100 alloy, "dead-soft" temper, approximately 0.001 inch in thickness. The sleeve when formed into cylindrical shape may be approximately 7¼ inches in diameter and 9⅞ inches high. When folded for packaging, as shown in FIG. 13, the aluminum foil sleeve may be approximately 5⅞ by 9⅞ inches, and four foil layers thick. The notched openings 62 in the foil blank may extend, for example, for a height of 1¾ inches and have a base which extends 2¾ inches circumferentially of the erected cylindrical chimney. The ribs 60 may be spaced approximately 1 7/16 inches apart. The dimensions just given are based on the assumption that the aluminum foil chimney will be used with a 5 inch x 5 inch x 6 inch fuel box (5-inch square base). A fuel box so dimensioned would have a diagonal dimension of 7.07 inches as seen in the schematic diagram of FIG. 6, so that if the cylindrical chimney 12 has a diameter of 7.25 to 7.50 inches, sufficient clearance is provided between the inner diameter of the chimney and the outer diagonal dimension of the fuel box to permit the cylindrical chimney 12 to be easily slipped over the fuel box. It will be understood that all of the dimensions given are merely suggested examples. The inner diameter of the substantially cylindrical chimney may in fact be smaller than the outer diagonal, i.e., the maximum transverse dimension, of the fuel box so long as the spacing between fuel box and chimney is not unduly restricted.

The size of the chimney relative to the fuel box influences the speed of ignition, the ease of application of the match to the fuel box, and the amount of smoke produced during ignition of the charcoal. When the chimney and fuel box have the relative dimensions of the example just given, there is an unrestricted air flow between the fuel box and the chimney during the early stages of fuel ignition, which is important to satisfactory ignition of the solid fuel. Furthermore, the approximate clearance given in the example positions the lighting holes 42 at the corners of the fuel box sufficiently close to the notches 62 in the chimney to permit easy application of a match to the fuel box when starting the fire.

If the chimney is too small in diameter or other maximum transverse dimension relative to the diagonal dimension of the fuel box, it would be difficult to slip the chimney over the fuel box, and furthermore the air flow in the smaller flues would be decreased so that the fuel box might not burn freely, thereby producing excessive smoke and increasing the ignition time. When the chimney is excessively large in diameter relative to the fuel box, unless the chimney height is increased the chimney ceases to function as a chimney and the fuel box burns in a "wide open space." Another disadvantage of excessive clearance between the chimney and the fuel box is that it makes difficult the application of a match to the notched corners of the fuel box through the notches 62 of the chimney. Still another disadvantage of too much clearance between the chimney and the fuel box is that with a larger clearance there is more chance that the shifting and falling charcoal briquettes may strike the chimney with sufficient force to damage or distort the walls of metal foil, thereby impairing the draft. Furthermore, a chimney which is very loose does not cooperate with the fuel box to keep the coals concentrated while they are being ignited. That is, the charcoal lumps or briquettes fall out of the fuel box as it burns and are not concentrated by the loose chimney so that the ignited area spreads slowly. Thus, while there is some latitude in selecting the dimensions of the chimney relative to the fuel box, either too great or too little clearance between the inner diameter of the chimney and the outer diagonal dimension of the fuel box results in less than optimum performance of the fire kindling device.

The cross sectional shape of the chimney is not critical and it may be circular, elliptical, square, rectangular, or any other convenient shape in cross section. Similarly, the fuel box need not necessarily be of square cross section as in the preferred embodiment, but may be of other shapes, provided that the cross-sectional shapes of the fuel box and chimney are compatible with each other so that the chimney may be easily slipped into position over the fuel box with sufficient clearance between the inner surface of the chimney and the outer surface of the fuel box to provide good flues to permit unrestricted burning of the fuel box, and without excessive clearance between the chimney and the fuel box. However, the square cross section fuel box in combination with the circular cross section chimney is the preferred embodiment of the invention since it permits the square corners of the fuel box to be close to the notched openings of the chimney for ease in lighting, while the remaining air space between the chimney and the fuel box is substantially evenly distributed along the four side walls of the fuel box. Furthermore, since the circle encloses the largest area for a given perimeter, this is an attractive form for economical reasons also.

The speed of ignition of the charcoal can be increased by increasing the height of the chimney. However, the selection of the height of the chimney and also the selection of the amount of wax impregnated in the fuel box are to some extent questions of economics since a faster fire requiring higher and thicker chimneys and larger amounts of wax is more expensive than may be economically justified.

While aluminum foil is the preferred material for use in constructing the chimney, other metal foils, such as steel foil or tin-plated steel foil, may be used, as well as certain suitable fire resistant papers, plastics, or the like. Aluminum foil has high infrared reflectivity which aids in fast starting of the fire, as shown by tests conducted on galvanized iron and aluminum foil chimneys. Under practically identical conditions, fire kindling devices in accordance with the invention having aluminum foil chimneys 12 inches in height required approximately five minutes for ignition time, while similar fire kindling devices using galvanized iron chimneys required approximately seven minutes ignition time. Metal foil has the advantage that it cools quickly after it has been removed from the fire, thus providing increased safety as compared to use of thicker sheet metal for the chimneys. Aluminum foil is readily available and relatively inexpensive in the gauges of 0.0005 inch to 0.005 inch which appear reasonable for this application. Also, aluminum has the desirable characteristic of melting at about 1220° F. so that foil about 0.0007 inch to 0.002 inch thick will partially melt and cause the chimney to collapse or split at about the time the charcoal is completely ignited. This serves to decrease the draft and prevent excessive burning of the coals. If the chimney is not removed immediately the coals are ready.

Figure 14:
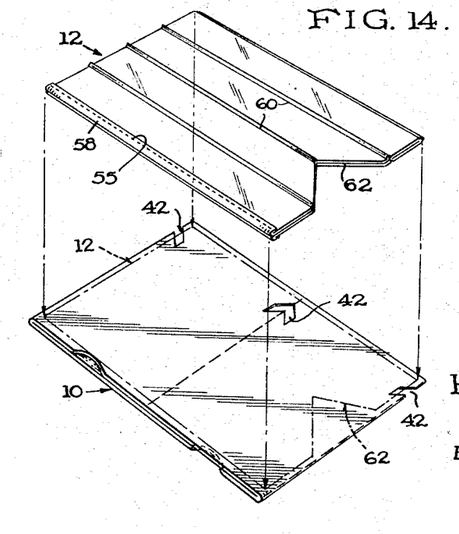
FIG. 14 is an exploded view showing the flat folded fuel box in the form of FIG. 9 and the flat folded metal foil chimney in the form of FIG. 13, in position to be placed in superposed relation for packaging.
Figure 15:
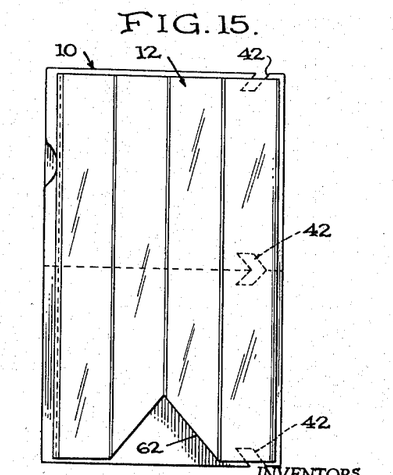
FIG. 15 is a plan view of the superposed folded fuel box blank and folded metal foil chimney blank ready for packaging.

It may be further explained that when the fuel box 10 and the chimney 12 have the proportions just described, that is, when the fuel box is 5 inches x 5 inches x 6 inches (5-inch square base), and the chimney is 7¼ inches to 7½ inches in diameter and 9⅞ inches long, the aluminum sleeve which forms the chimney when folded has an approximate dimension of 5⅞ inches x 9⅞ inches. The fuel box when folded to the form shown in FIG. 9 is 6 inches x 10 inches. Hence, the folded fuel box 10 has slightly larger width and length dimensions than the folded aluminum foil blank 12 which forms the chimney, and thus when the chimney blank is superposed on the fuel box blank for packaging as shown in FIGS. 14 and 15, the fuel box blank 10 is slightly larger than the folded chimney blank 12 to provide a support for the more fragile chimney blank.

*Mode of operation*

It will be understood that in using the fire kindling device hereinbefore described, the consumer unwraps the unitary package in which the folded fuel box blank and chimney blank lie in superposed relation to each other. The opposite vertical side edges of the folded fuel box blank 14 are pushed sharply inwardly as shown in FIG. 2 to cause the folded fuel box to swing open into its substantially square cross section shape. The bottom panels 32, 34, 36, 38 which form the automatic self-locking bottom of the fuel box snap into locked position to assume the form shown in FIG. 10. The upwardly open fuel box 10 is then filled with charcoal briquettes or the like by pouring the briquettes into the container, as shown in FIG. 3.

Figure 12:
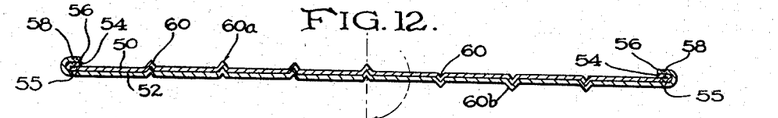
FIG. 12 is a view in section along line 12—12 of FIG. 11.

The folded aluminum foil blank which forms the chimney 12 and which is packaged in the double folded form shown in FIG. 13 is then unfolded into the shape shown in FIG. 12 in which the two webs 50 and 52 forming the opposite walls of the blank are still in closely superposed relation to each other. The two webs 50 and 52 are separated and the consumer inserts his hands into opposite axial ends of the foil sleeve member in the manner of a "muff" as diagrammatically shown in FIG. 4, and rolls the foil sleeve until it assumes a generally cylindrical shape. The cylindrical chimney member 12 is then telescopically positioned over the filled fuel box as best seen in FIG. 5, aligning the notches 62 at the lower end of the chimney with the air inlet and lighting notches 42 at the four corners of the fuel box. The fire kindling device is now ready to be ignited. A match is lighted and inserted through the notched opening 62 of the chimney and into contact with the tips 44a, 44b of the notch 42 at the respective corner of the fuel box. If the tips 44a, 44b have been "fuzzed" during the manufacturing operation, as hereinabove suggested, ignition of the fuel box is facilitated. The match is preferably applied to notches 42 at all four corners of the fuel box.

The following is a postulated sequence of the ignition after the lighted match is applied to the notched corners of the fuel box:

(1) The lighting of the fuel box by the match causes rapid burning of the side walls of the box and ignites the edges of the charcoal briquettes near the side walls of the box. As the side walls of the box collapse from burning, the briquettes fall against the chimney and rearrange themselves. The initial draft during this portion of the burning sequence is usually sufficient to give a very hot flame.

(2) The multi-ply bottom of the container burns relatively steadily with a "candle effect" and the draft is maintained while more edges of the charcoal briquettes are lit near the center of the fuel box. The multi-ply bottom of the box burns more slowly than the side walls of the box and preserves the flame until the draft increases as the total ignited area of the briquettes increases.

(3) As more and more surface areas of the charcoal briquettes are ignited, the areas begin to consolidate and the draft increases. Hot gases pass through the pile of briquettes and preheat the fuel so that kindling occurs easily.

(4) As the temperature increases, the draft continues to increase and a cumulative action occurs, spreading the ignition rather evenly throughout the briquettes in the box.

(5) About the time the ignition of the charcoal is completed, the heat generated has weakened the incombustible aluminum foil chimney and a sufficiently high temperature is reached at some points so that the walls of the chimney rupture and the fuel falls out through the sides of the chimney. This splitting or collapsing of the chimney in the final stages of ignition is useful in order that the draft effect of the chimney may be drastically reduced at about the time when ignition of the charcoal is complete. This allows normal burning to proceed thereafter, so that the fuel will not be too quickly consumed.

The exact time for complete ignition is influenced by a number of variables in addition to chimney height and the combustible materials embodied in the fuel box. Thus, the type of charcoal (hard wood, soft wood, oat hulls, pecan and other nut hulls, etc.) has a bearing on the ignition time. The size and shape of the briquettes also have a bearing on the ignition time. If small briquettes are used, the flow of air and hot gases is diminished since the passages through the charcoal mass are smaller than with large briquettes. Also, if the briquettes have sharp edges they are easier to light than if they have rounded edges.

After the ignition of the charcoal briquettes is completed, the fuel box is usually completely consumed except for a small amount of ash, and the residue of the metal foil chimney which remains may be easily removed from the fire by the use of tongs or the like.

Modifications

Sheets 4 and 5 of the drawings illustrate, in FIGS. 16–27, certain of the numerous modifications in which the invention may be embodied within the broad principles intended to be covered by the appended claims.

Figure 16:
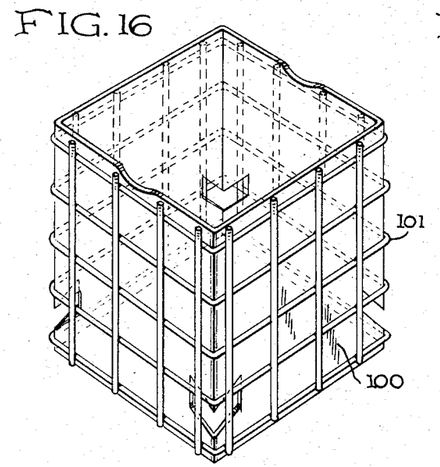
FIG. 16 is a perspective view of a fuel box or container member and enclosing member assembly comprising another embodiment of the invention.

FIG. 16 shows a fuel box or container member 100 similar to the element 10 previously disclosed except that it may be made and sold in erected form permanently surrounded by a tubular enclosing member 101 formed of coarse open mesh metal wire of sufficiently heavy gauge to withstand collapse during burning of the container member and ignition of the solid fuel therein and of mesh size somewhat smaller than that of the fuel lumps. It will be noted that this enclosing member, like its counterpart, the chimney member 12, makes only limited contact with the walls of the fuel box and leaves exposed for ready combustion large areas which are visible in FIG. 16 through the mesh opening. However, since it is of mesh rather than solid material, no flues are defined between the fuel box, which is designated 100, and enclosing member 101 and the ignition will not be expected to be as rapid as when flues are present.

Figures 17, 19, 20, 21, 22, 23:
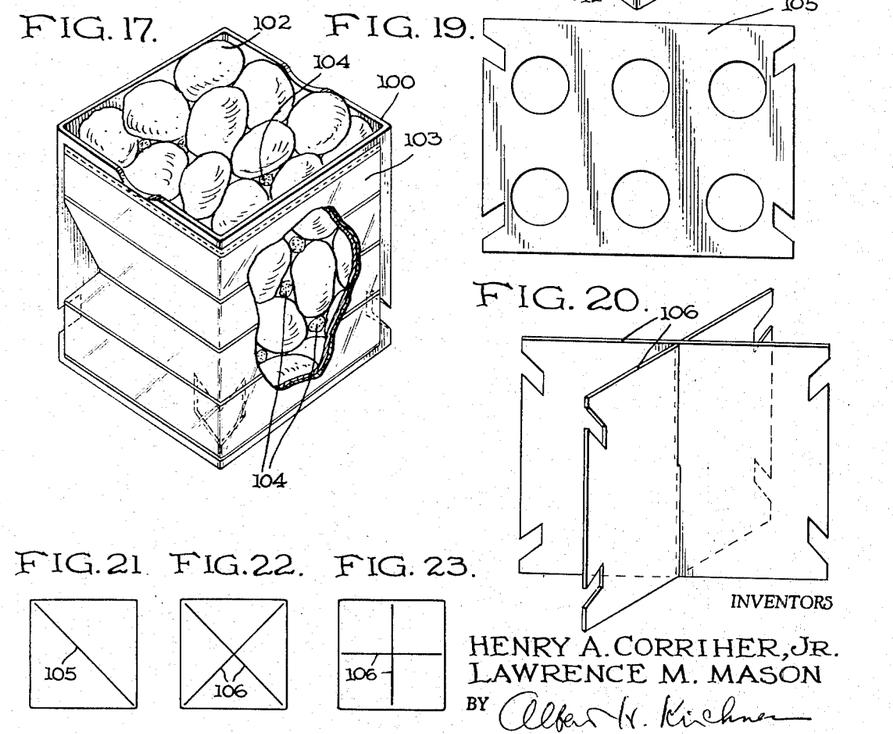
FIG. 17 is a perspective view of a merchandisable package unit constituting still another embodiment of the invention.
FIG. 19 is an elevational view of the partition element of FIG. 18.
FIG. 20 is a perspective view of a double form of partition element.
FIGS. 21, 22 and 23 are diagrammatic views of container member and partition element combinations.

FIG. 17 shows a complete combination of fuel box or container member, chimney member, and fuel fill assembled as a merchandisable package unit. In this embodiment of the invention the fuel box 100 may be similar to element 10 and may be made permanently erected in operative form, as in FIG. 16. The unit includes a suitable quantity of charcoal briquettes or lumps 102, and a chimney member 103 which may be identical with the chimney 12 and be folded as in FIG. 14 and wrapped around the box.

Figure 18:
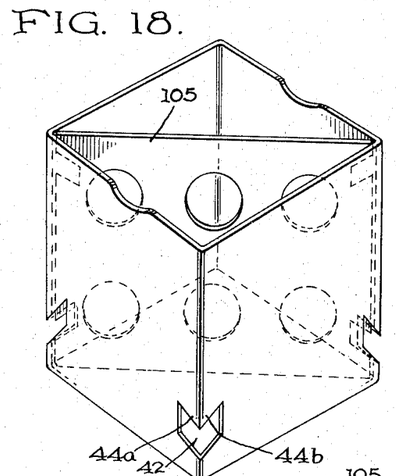
FIG. 18 is a perspective view of the fuel box or container member, illustrating the addition of an optional flame extending partition element.

In the case of any particularly large quantity of fuel it may be desirable to accelerate ignition, and this can be accomplished in any of several ways. One expedient, shown in FIG. 17, comprises interspersing throughout the fuel mass a number of kindling pieces 104 in the form of small bits of the same impregnated chipboard or equivalent material of which the box itself is made. Another consists in partitioning the box with a divider sheet 105 which may be perforated as shown in FIGS. 18 and 19, or a pair of such sheets 106 which may be perforated or unperforated as shown in FIG. 20. FIGS. 21, 22 and 23 illustrate schematically how these divider sheets can be arranged in the box. In each case the sheet material is or may be the same as that of the box itself, i.e., impregnated or coated chipboard or the like, and the partition may be packed flat with the collapsed, folded box or may be positioned in the erected box before filling. It will be obvious that the sheets will start to burn promptly when the box is ignited and will immediately transmit combustion to the interior of the fuel mass, thus serving as "flame extenders" for initiating ignition in the center of the fuel at about the same time that combustion of the outer lumps begins.

Figure 24:
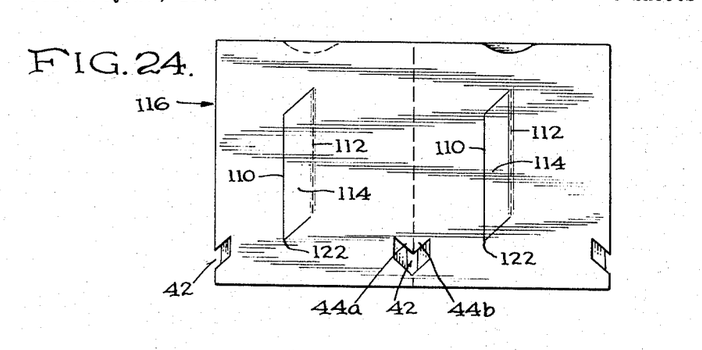
FIG. 24 is a view of a fuel box or container member folded as in FIG. 9 modified by the addition of cuts and perforations to provide "spacer flaps"
Figure 25:
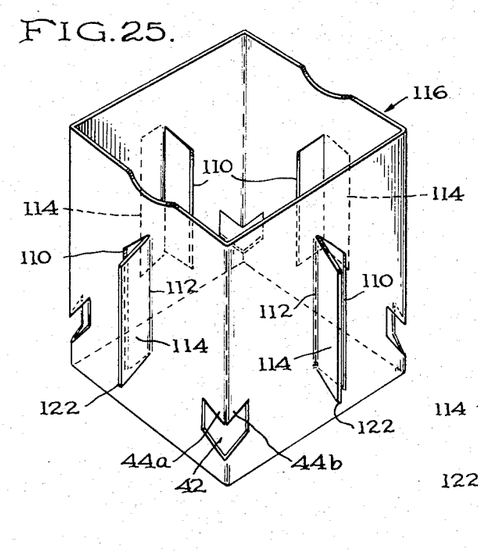
FIG. 25 is a perspective view of the fuel box or container member of FIG. 24 erected and with the "spacer flaps" pushed out to operative position.

FIG. 24 shows a fuel box or container member 116 similar to the element 10 previously disclosed except that additional cuts 110 and cooperating lines of perforations 112 have been made to define "spacer flaps" 114. The purpose of these flaps is to assist in maintaining the spacing between the fuel box 116 and chimney member 118 during the burning of the side walls of the fuel box. That is, these flaps help to hold the chimney away from the walls of the box as the chimney is placed over the box as well as maintaining the spacing between box and chimney which defines the flues when the rapid passage of the gases in the flues tends to cause the chimney to come inward because of Bernoulli effect. Although the flaps burn out rapidly, they promote the initial burning of the box walls and allow production of high temperatures which are necessary for getting the charcoal edges lighted initially. Furthermore, because the box walls burn more completely during this initial period, there is less smoke produced during the middle portion of the lighting sequence than when spacers are not used.

Figure 26:
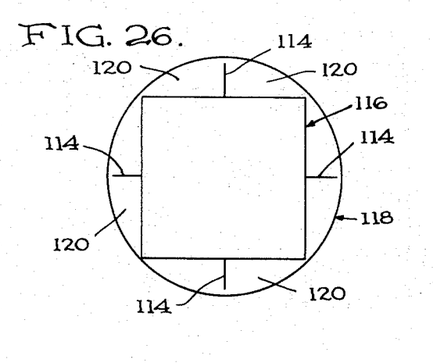
FIG. 26 is a diagrammatic view showing the relationship between the fuel box with "spacer flaps" and the chimney member.
Figure 27:
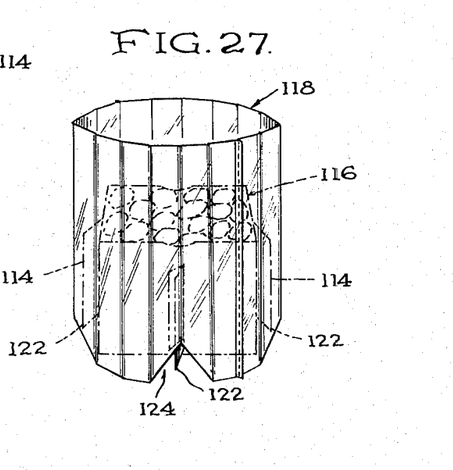
FIG. 27 is a perspective view showing the chimney member in position with respect to the fuel box of FIG. 25 in a relationship alternative to that of FIG. 1 to allow lighting of the "spacer flaps" instead of the box corners.

In operation, the fuel box 116 is erected normally and the flaps 114 are bent outward along the hinges formed by the lines of perforations 112. The chimney element 118 is telescopically positioned over the box and, as shown in the schematic diagram of FIG. 26, is held away from the side walls of the box to ensure air spaces 120 which extend vertically between the box and chimney and serve as flues while the box walls are burning. The overall distance between outside edges of the opened flaps is about equal to the diagonal dimension of the fuel box to allow the chimney to fit loosely thereabout.

The top edges of the flaps are sloped downward to allow the chimney to be positioned over the box without snagging, while the bottom edges are similarly sloped downward to provide sharp points 122 which may serve as lighting points similar to the points 44a, 44b. This feature allows an alternative position of the chimney with respect to the fuel box as shown in the perspective view of FIG. 27. Here the box is positioned within the chimney so that the spacer flaps are aligned with the notches 124 in the bottom of the chimney. The lighting points 122 extend downward into the notches 124 so that they may be easily lighted by touching a match thereto.

It is believed to be evident from the foregoing that there is provided in accordance with this invention a fire kindling device which has a number of advantages. The device is safe to use, provides uniform burning of the solid fuel by the end of the ignition period, and does not require touching of the dirty fuel pieces during the kindling operation. The device includes two basic components which can be folded to a flat compact form and easily and inexpensively merchandised, requiring that only a minimum of storage space be provided by the vendor as well as by the purchaser. The invention provides a relatively combustible fuel box and a cooperating relatively incombustible chimney which permit the ignition of charcoal or other solid fuel in a much shorter time than most devices of the prior art. The kindling device leaves no objectionable residue when the ignition is complete and the chimney may be easily removed after the ignition is complete, leaving only the ignited fuel. We have found that approximately 2¼ pounds of hardwood charcoal briquettes are ignited in about nine minutes when using a chimney with a height of 9⅞ inches and a diameter of 7½ inches in combination with a fuel box 6 inches high and 5 inches square. The kindling device is particularly suitable for use in lighting charcoal for home use and can also be used for campfires or emergency fires under survival conditions.

While the invention mainly contemplates the use of the container or fuel box and the chimney in combination, in the manner and with the results hereinabove described, we are cognizant of the fact that under some circumstances and for some purposes it is possible to put either of these elements to use alone. Thus, for example, the container may be found useful without the chimney, particularly when its fuel contents are such as are very readily ignited and hence it becomes unnecessary to surround the container with an incombustible chimney to provide for sustained draft or to cooperate in holding the solid fuel in a compact mass during ignition. Again, the chimney may be found useful at times for igniting fuel loosely filling it, without the use of a fuel box, with paper, lighter fluid, or the like used as the kindling material. Moreover, since the chimney may be of permanent form and hence readily survive a single use, a succession of expendable fuel boxes may be used in the same chimney. For these reasons it may be found desirable to merchandise the chimneys and the containers separately for these several uses.

Accordingly it is believed that adequate protection of the invention requires claiming the fuel box and the chimney separately and independently from each other as well as in combination.

While there have been shown and described particular embodiments of the invention that have been tested in use and found entirely satisfactory and hence are preferred, it will be obvious to those skilled in the art that various changes and modifications may be made therein without departing from the broad principles of the invention, and therefore it is aimed in the appended claims to cover all such changes and modifications as fall within the true spirit and scope of the invention.

We claim:

1. A kindling device for igniting solid fuel such as charcoal briquettes or lumps comprising the combination of a container member having substantially upright walls formed of combustible material and adapted to contain a quantity of said solid fuel, and an enclosing member comprising a generally imperforate tube of relatively incombustible material adapted to be positioned about the container member with portions of substantial area spaced therefrom so as to expose substantial areas of the container member walls for burning and thereby define a plurality of circumferentially spaced upright flues between said container member and enclosing member and extending the full height of the container member, said enclosing member having an opening in at least its lower portion for admission of air to said flues to support combustion of fuel in the container member and said enclosing member being adapted to provide lateral support for said solid fuel after the container member has partially burned away.

2. The combination claimed in claim 1 in which the container member is rectangular in cross section and the enclosing member is substantially cylindrical, with the corners of the container member adapted to be disposed in close proximity to the inner surface of the enclosing member and with the spaces between adjacent corners forming the flues.

3. The combination claimed in claim 1 in which the container member is formed of combustible fibrous sheet material and the enclosing member is formed of metal foil.

4. The combination claimed in claim 1 in which the container member is formed of combustible fibrous sheet material and the enclosing member is formed of aluminum foil of a gauge and composition adapted to cause the enclosing member to rupture and collapse at about the time the fuel is completely ignited.

5. The combination claimed in claim 4 in which the aluminum foil is approximately 0.0005 to 0.005 inch in thickness.

6. The combination claimed in claim 1 in which the container member is formed of fibrous sheet material of the class consisting of fiberboard or chipboard impregnated with paraffin.

7. A kindling device as claimed in claim 1 in which the combination comprises a merchandisable unit, the container member having its side walls foldable into flat superposed engagement with each other and the enclosing member being formed of metal foil collapsible into flat condition and packaged with the folded container member.

8. A kindling device as claimed in claim 1 in which the combination comprises a merchandisable unit, the container member containing fuel and the enclosing member being formed of metal foil collapsible into multi-ply flat condition foldable about the container member for packaging therewith.

9. A kindling device as claimed in claim 1 in which the tubular enclosing member has a ratio of height to maximum transverse dimension greater than 1:1.

10. A kindling device as claimed in claim 1 in which the container member has openings at spaced intervals around its perimeter for admission of air to the interior of the member and for the application of a match or the like to the member, at least one of said container member openings being registrable with said opening in the enclosing member.

11. A kindling device as claimed in claim 10 in which the openings in the container member are shaped to include projecting points of the material of the container member to which a lighted match or the like may be applied to ignite said member.

12. A kindling device as claimed in claim 1 in which the enclosing member is formed of metal foil having a plurality of ribs formed integrally in it and extending axially at peripherally spaced intervals for imparting stiffness to the member.

13. A kindling device as claimed in claim 7 in which the container member comprises a foldable blank of sheet material having a plurality of side wall forming panels and a plurality of bottom forming tabs integrally connected to said side wall forming panels, the side edges of adjacent panels being connected together to form a continuous sleeve-shaped body, and the tabs being foldable between said panels and projectible into mutually interlocked relation when the panels are unfolded and expanded to form the blank into an open container of parallelopiped shape.

14. A kindling device as claimed in claim 7 in which the container member side walls are formed with partially cutout areas adapted to be foldable out in extended position so as to form spacer flaps for positioning the enclosing member substantially symmetrically about the container member with intervening flue spaces.

15. A kindling device as claimed in claim 1 in which the container member includes flame extender means comprising a vertically extending partition disposed substantially completely across the interior of the container member from one side wall to another, said partition being adapted to become ignited by one of said side walls and spread ignition to fuel in the center of the container member.

References Cited

UNITED STATES PATENTS

| 2,738,260 | 3/1956 | Wolfson et al. | 44—40 |
| 2,943,557 | 7/1960 | Suehlsen | 126—9 X |
| 3,031,277 | 4/1962 | Strauss | 44—40 |
| 3,121,408 | 2/1964 | Haning | 110—1 |

FOREIGN PATENTS 424  2/1864  Great Britain.

OTHER REFERENCES

Housewares Review, "Charcoal Blazer," January 1959, p. 238.

DANIEL E. WYMAN, *Primary Examiner.*

JAMES W. WESTHAVER, *Examiner.*

R. A. DUA, C. F. DEES, *Assistant Examiners.*